(12) United States Patent
Ring et al.

(10) Patent No.: US 9,119,058 B2
(45) Date of Patent: *Aug. 25, 2015

(54) NETWORK SERVERS, SYSTEMS, AND METHODS FOR MULTIPLE PERSONAS ON A MOBILE DEVICE

(71) Applicant: AT&T Intellectual Property I, L.P., Atlanta, GA (US)

(72) Inventors: Douglas Scott Ring, Carrollton, TX (US); Yakun Gao, Suwanee, GA (US); Karen Mullis, Loganville, GA (US); Steven A. Siegel, Mendham, NJ (US); Scott Andrew Steinbrueck, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,736

(22) Filed: Apr. 14, 2014

(65) Prior Publication Data

US 2014/0220932 A1 Aug. 7, 2014

Related U.S. Application Data

(63) Continuation of application No. 12/849,495, filed on Aug. 3, 2010, now Pat. No. 8,699,413.

(51) Int. Cl.
*H04W 4/24* (2009.01)
*H04L 29/08* (2006.01)
(Continued)

(52) U.S. Cl.
CPC ............... *H04W 4/24* (2013.01); *G06Q 20/14* (2013.01); *H04L 67/141* (2013.01); *H04L 65/1016* (2013.01); *H04L 67/306* (2013.01)

(58) Field of Classification Search
CPC .. G06Q 20/14; H04L 65/1016; H04L 67/141; H04L 67/306; H04W 4/24
USPC ............... 370/310, 328, 338; 455/403, 422.1, 455/445, 406
See application file for complete search history.

(56) References Cited

U.S. PATENT DOCUMENTS 5,764,730 A * 6/1998 Rabe et al. ............... 455/403
7,088,989 B2 8/2006 Guo
(Continued)

OTHER PUBLICATIONS

U.S. Appl. No. 12/849,495 Office Action dated Sep. 11, 2012.
(Continued)

*Primary Examiner* — Chi H Pham
*Assistant Examiner* — Robert Lopata
(74) *Attorney, Agent, or Firm* — Hartman & Citrin LLC

(57) ABSTRACT

Network servers, systems, and methods are disclosed which relate to providing a plurality of user identities or personas on a single mobile device. The mobile device has a unique address to communicate with entities on the network. The mobile device is further associated with a plurality of telephone numbers. The usage of each telephone number may be billed to a separate account. Each telephone number is associated with a plurality of personas, and each persona has a corresponding visual interface on the mobile device and a corresponding set of rules. The relationship between personas, telephone numbers, and associated rules is stored on an application server on the network. The application server routes incoming connections to a specific persona on the mobile device based on the plurality of rules. The rules can be edited by a user of the mobile device via an interface or another device connected to the network.

20 Claims, 11 Drawing Sheets

(51) Int. Cl.
G06Q 20/14 (2012.01)
H04L 29/06 (2006.01)

(56) References Cited

U.S. PATENT DOCUMENTS

| | | | |
|---|---|---|---|
| 7,511,603 B2 * | 3/2009 | Hellebust et al. | 340/7.5 |
| 7,787,870 B2 * | 8/2010 | Burgan et al. | 455/415 |
| 8,032,143 B2 * | 10/2011 | Silver et al. | 455/445 |
| 8,155,299 B2 * | 4/2012 | Koch et al. | 379/211.02 |
| 8,189,535 B2 * | 5/2012 | Akselsen | 370/331 |
| 8,429,260 B2 * | 4/2013 | Siegel et al. | 709/223 |
| 2004/0166807 A1 * | 8/2004 | Vesikivi et al. | 455/41.2 |
| 2004/0192386 A1 | 9/2004 | Aerrabotu et al. | |
| 2005/0008135 A1 * | 1/2005 | Bressler | 379/211.01 |
| 2007/0105531 A1 | 5/2007 | Schroeder et al. | |
| 2008/0133716 A1 | 6/2008 | Rao et al. | |
| 2008/0205655 A1 * | 8/2008 | Wilkins et al. | 380/279 |
| 2008/0220719 A1 * | 9/2008 | Sakhpara | 455/41.2 |
| 2010/0046486 A1 * | 2/2010 | Maruyama | 370/338 |
| 2011/0053574 A1 | 3/2011 | Rice | |
| 2011/0061008 A1 | 3/2011 | Gupta et al. | |
| 2011/0071924 A1 * | 3/2011 | Desmond et al. | 705/27.1 |

OTHER PUBLICATIONS

U.S. Appl. No. 12/849,495 Office Action dated Apr. 15, 2013.
U.S. Appl. No. 12/849,495 Office Action dated Aug. 6, 2013.
U.S. Appl. No. 12/849,495 Notice of Allowance dated Nov. 20, 2013.

* cited by examiner

NETWORK SERVERS, SYSTEMS, AND METHODS FOR MULTIPLE PERSONAS ON A MOBILE DEVICE

CROSS-REFERENCE TO RELATED APPLICATION

This application is a continuation of and claims priority to U.S. patent application Ser. No. 12/849,495, filed Aug. 3, 2010, now U.S. Pat. No. 8,699,413, the entire contents of which is incorporated by reference herein.

BACKGROUND OF THE INVENTION

1. Field of the Invention

The present invention relates to mobile devices. In particular, the present invention relates to using a single mobile device with a plurality of personas.

2. Background of the Invention

Mobile devices are proliferating across the market. End users are dealing with the complexity of bridging their work life and personal life. These users are dealing with information overload, and are being subject to too many calls, messages, and emails. They have to balance their personal contacts and their business contacts, their personal email and business email, their personal calendar and their business calendar, and different security needs of business applications and consumer applications.

Notably, an increasingly common trend is for users to carry multiple devices for different purposes. A corporation might issue enterprise devices to their employees, for instance, a Blackberry®. For a variety of reasons such as security, personal preference, etc., users may also maintain personal devices to store personal contacts, download music and videos, and execute applications. However, maintaining separate devices is cumbersome. Some users have resorted to using multiple network interfaces, such as Subscriber Identity Module (SIM) cards, on a single device. This is not an ideal solution as physical actions need to be taken in order to swap the SIM card for different purposes. Also, this solution is not feasible for receiving calls from different types of contacts—only one "phone" is active at one time.

Another solution involves an intermediary such as a network server or other entity that processes incoming phone calls based on a set of rules defined by the user, for instance, Google Voice®. However, these solutions have several problems of their own, the primary one being that there is no integration with the existing mobile network. Complications arise with the use of such services as multiple phone numbers are issued to communicate between a user's mobile device and remote devices on the network. Further, none of the existing solutions makes full use of the IP capabilities of a service provider's network, such as an IP Multimedia Subsystem (IMS). Another solution is an application on the device allowing a user to create and select personas such as user accounts. However, this solution offers no integration with the network itself. Consequently a user has to give out the same telephone number/endpoint address to different parties such as friends, co-workers, and business contacts.

What is needed is a simple and effective way to provide call processing for different contexts for a single user without using multiple devices.

SUMMARY OF THE INVENTION

The present invention solves the above problems by providing a plurality of user identities or personas on a single mobile device. The mobile device has a unique address, such as an IP address, to communicate with entities on the IP network, such as an application server. The mobile device further has a plurality of telephone numbers associated with it. The usage of each telephone number may be billed to a separate account. For instance, one telephone number is a business or enterprise account, and the other telephone number is a personal account. Further, each telephone number has a plurality of personas associated with it. Each persona has its own visual interface on the mobile device and a corresponding set of rules. The application server on the network routes incoming connections to a specific persona on the single mobile device based on the plurality of rules, which are stored on the network. The plurality of rules filters incoming connections based on telephone number, time, and categories of contacts, and varies based on the associated persona. The rules can be edited by a user of the mobile device via an interface. The interface is accessible via an application on the mobile device, or via another device such as a personal computer. The incoming connection can be a telephone call, a text or multimedia message, an e-mail message, etc. When receiving an incoming connection, the originating number and the called number are both displayed on the device. For outgoing calls, the user chooses a persona to dial out from, or logic on the device or on the network automatically selects the appropriate persona. A SIP stack, which may be open-source, on the mobile device enables seamless communication with an IP multimedia subsystem, wherein the server is an application server. The application server uses SIP to set up a real-time transport protocol (RTP) session. The session may be a secure IP tunnel, or a secure link using IPSec. Each persona on the device may be a separate virtual machine such that they are securely isolated from each other. Non-IP connections such as regular PSTN voice calls can be routed to the mobile device from the IP network using one or more gateways.

In one exemplary embodiment, the present invention is a server on a network for routing a connection request to a mobile device on the network, the mobile device having a unique network address. The server includes a processor; a memory in communication with the processor; a database on the memory, the database including a record for the mobile device, the record including one or more telephone numbers corresponding to the mobile device and one or more personas corresponding to each of said one or more telephone numbers; and logic on the memory, the logic enabling the server to receive a connection request from a remote device on the network, determine that the destination for the connection request is the mobile device, activate one or more services in response to the connection request, associate a persona with the connection request, and initiate a session between the remote device and the associated persona on the mobile device. The association of the persona with the connection request is performed by referring to a plurality of rules corresponding to the record for the mobile device, the plurality of rules being adjustable by the user via a configuration manager on the mobile device.

In another exemplary embodiment, the present invention is a system for multiple uses of a mobile device. The system includes an application server on a network, the application server including a database having a record for the mobile device, the record including one or more telephone numbers corresponding to the mobile device, one or more personas corresponding to each of said one or more telephone numbers and a plurality of rules related to each of said one or more personas; and a mobile device having an interface for each of said one or more personas, a connection manager to send and receive connection requests to and from each of said one or more personas, and a configuration manager to enable a user of the mobile device to edit the plurality of rules in the database. The application server receives a connection request from an originating remote device on the network, determines that the destination for the connection request is the mobile device, activates one or more services in response to the connection request based on the plurality of rules, associates a persona with the connection request based on the plurality of rules, and initiates a session between the remote device and the associated persona on the mobile device.

In yet another exemplary embodiment, the present invention is a method for using a mobile device for multiple purposes. The method includes receiving a connection request from a transmitting remote device on a network; determining that the connection request is destined for the mobile device; activating one or more services in response to the connection request based on a plurality of rules stored on a database, the database having a record for the mobile device, the record including one or more telephone numbers corresponding to the mobile device, one or more personas corresponding to each of said one or more telephone numbers, wherein the plurality of rules relate to each of said one or more personas; associating a persona with the connection request based on the plurality of rules; and initiating a session between the source remote device and the associated persona on the mobile device. The session is initiated using the Session Initiation Protocol (SIP). The one or more services may include sending to voicemail, call forwarding, and call blocking, among other network features. The plurality of rules allows a user to activate services depending upon any combination of a date, time of day, location of the mobile device, address of the incoming connection request, persona, and category of incoming connection request.

DETAILED DESCRIPTION OF THE INVENTION

Figure 1:
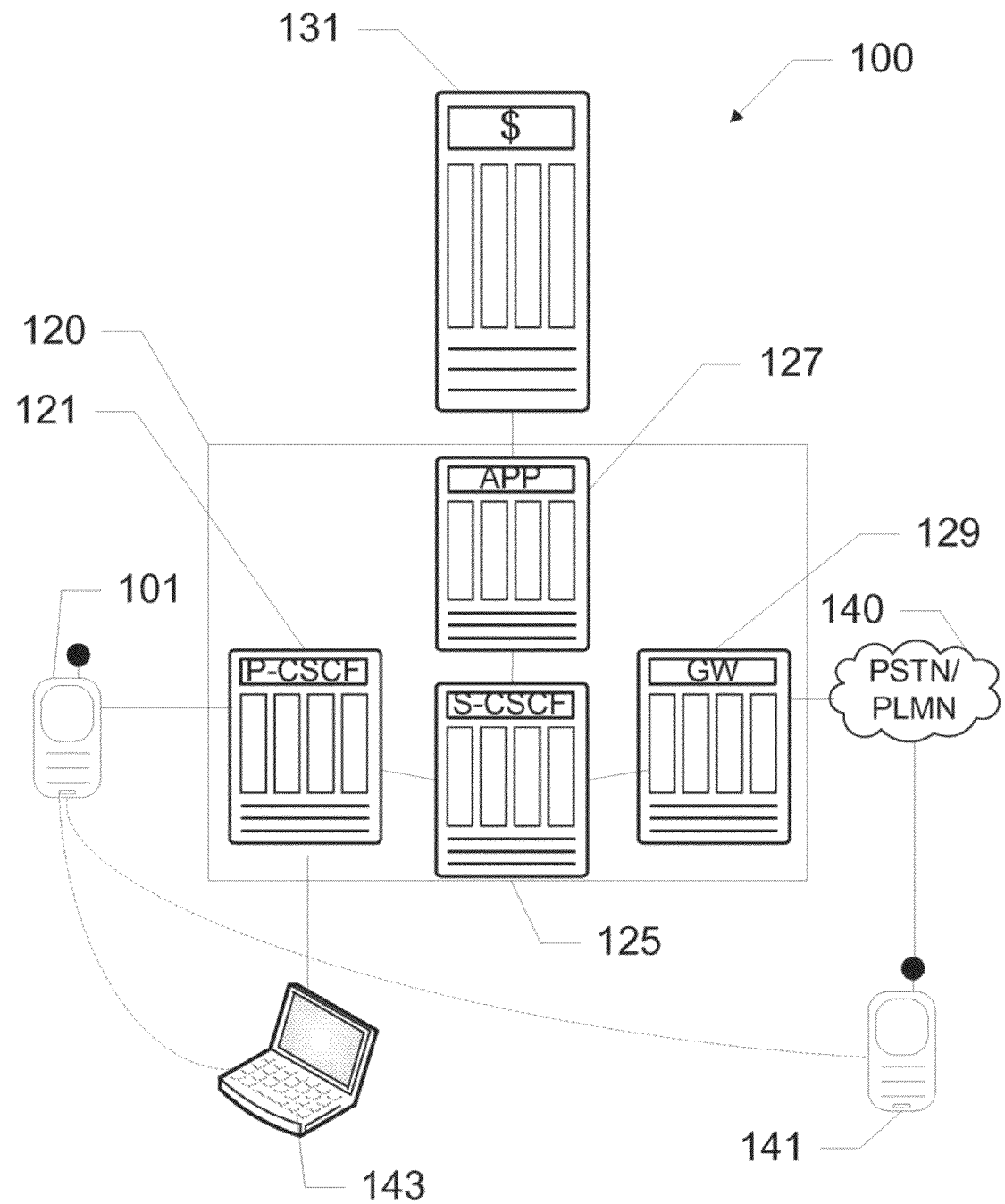
FIG. 1 shows a system for providing multiple personas on a mobile device, according to an exemplary embodiment of the present invention.

The following detailed description describes devices, systems, and methods for providing a plurality of user identities or personas on a single mobile device. The mobile device has a unique address, such as an IP address, to communicate with entities on the IP network, such as an application server. The mobile device further has a plurality of telephone numbers associated with it. The usage of each telephone number may be billed to a separate account. For instance, one telephone number is a business or enterprise account and the other telephone number is a personal account. Further, each telephone number may have a plurality of personas associated with it. Each persona has its own visual interface on the mobile device and a corresponding set of rules. The application server on the network routes incoming connections to a specific persona on the single mobile device based on the plurality of rules, which are stored on the network. The plurality of rules filters incoming connections based on telephone number, time, and categories of contacts, and varies based on the associated persona. The rules can be edited by a user of the mobile device via an interface. The interface is accessible via an application on the mobile device, or via another device such as a personal computer. The incoming connection can be a telephone call, a text or multimedia message, an e-mail message, etc. When receiving an incoming connection, the originating number and the called number are both displayed on the device. For outgoing calls, the user chooses a persona to dial out from, or logic on the device automatically selects the appropriate persona. A SIP stack, which may be open-source, on the mobile device enables seamless communication with an IP multimedia subsystem, wherein the server is an application server. The application server uses SIP to set up a real-time transport protocol (RTP) session. The session may be a secure IP tunnel, or a secure link using IPSec. Each persona on the device may be a separate virtual machine such that they are securely isolated from each other. Non-IP connections such as regular PSTN voice calls can be routed to the mobile device from the IP network using one or more gateways.

As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include UMTS, GSM, CDMA, WLAN and BLUETOOTH® networks, with communication being enabled by transceivers. Other examples of networks include public switched telephone networks (PSTN), public land mobile networks (PLMN), and IP Multimedia Subsystem (IMS) core network. The IP Multimedia Subsystem (IMS) is an architectural framework for delivering Internet Protocol (IP) multimedia services. See, for instance, 3GPP Technical Specification TS 23.228.

A network typically includes a plurality of elements such as servers that host logic for performing tasks on the network. Servers may be placed at several logical points on the network. Servers may further be in communication with databases and can enable communication devices to access the contents of a database. For instance, in an IMS network, an application server hosts an application accessible from an IP-enabled mobile device, and a database of settings or rules for the usage of that application. Other servers include the Call Session Control Function (CSCF) and the Home Subscriber Server (HSS). The CSCF node facilitates SIP session setup and teardown. The HSS plays the role of a location server in IMS, in addition to acting as an AAA server. Other servers are present such as proxy servers, routers such as edge routers, media gateways, etc. IMS networks are used for, among other things, Voice over IP (VoIP)—a general term for a family of transmission technologies for delivery of voice communications over IP networks. Other terms frequently encountered and synonymous with VoIP are IP telephony, Internet telephony, voice over broadband (VoBB), broadband telephony, and broadband phone.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

FIG. 1 shows a system for providing multiple personas on a mobile device, according to an exemplary embodiment of the present invention. In this embodiment, system 100 includes a mobile device 101 in communication with an IP Multimedia Subsystem (IMS) 120, including an application server 127, a gateway server 129, a Proxy Call Session Control Function (P-CSCF) 121, and a Serving Call Session Control Function (S-CSCF) 125). IMS 120 is in communication with a public switched telephone network (PSTN) 140, a billing server 131, and remote device 143. Mobile device 141 is in communication with PLMN 140.

IMS 120 is an architectural framework for delivering IP multimedia services. IMS 120 provides a collection of different functions, linked by standardized interfaces. IMS 120 uses Session Initiation Protocol (SIP), or another signaling protocol, to ease integration with the Internet. Each of application server 127, gateway server 129, S-CSCF 125, and P-CSCF 121 includes a SIP stack for such integration. Application server 127 includes a processor, a memory, and a database to store information related to a plurality of personas for mobile device 101. The database contains a record for mobile device 101. The record includes one or more telephone numbers corresponding to mobile device 101. Each of these telephone numbers has one or more personas corresponding to it and a plurality of rules related to each of the personas. Further, mobile device 101 is able to display a separate interface for each of the personas, as further described below.

The database of application server 127 also contains rules for the persona to be applied in various incoming or outgoing connections. A routing logic on the application server refers to these rules and appropriately handles routing of connections to and from multiple personas on mobile device 101. The rules also determine the features, security, and billing of each telephone number associated with mobile device 101. For instance, each persona corresponds to a particular telephone number, and connections made to and from each persona are billed to the account associated with the particular telephone number. Further, the rules on the database may be provisioned by the network, and can be edited or modified by a user of mobile device 101, either via a configuration manager application on mobile device 101, or any other interface (for instance a user account website). Application server 127 is connected to the backend network, via SIP, IP, or a signaling method using the appropriate gateways (not shown). The backend network may contain billing server 131 and additional servers and routers. Billing server 131 is in communication with a user account database and debits a corresponding user account based on a call data record (CDR) or other type of service usage record received from application server 127. A record for the user may be separated into one or more accounts corresponding to the telephone numbers associated with mobile device 101.

Gateway server 129 connects IMS 120 with other networks, such as PSTN 140 and/or a public land mobile network (PLMN). Gateway server 129 can be a serving gateway, media gateway, edge router, etc. as commonly known and used in existing IMS networks. PSTN or PLMN 140 provides network access to non-IP enabled mobile devices, such as mobile device 141. This can occur via a variety of methods that are not shown and includes network elements such as a Radio Access Network (RAN), a Wireless Local Area network (WLAN), etc. The same applies to mobile device 101, which can connect to IMS 120 via a Node B or base transceiver station in order to connect to a packet-switched core of a cellular network (e.g. GPRS), with the cellular network communicating with IMS 120 through P-CSCF 121. Other connection methods are possible, so long as the IP connectivity is enabled on mobile device 101. Mobile device 141 may connect to mobile device 101 through PSTN 140. Remote device 143 may connect to mobile device 101 through a packet-based network in communication with P-CSCF 121. P-CSCF 121 sits on a path of all signaling and can inspect every signal. P-CSCF 121 may provide subscriber authentication and may compress and decompress SIP messages. S-CSCF 125 is a central node of the signaling plane.

S-CSCF 125 is a SIP server and also may perform session controls. For instance, S-CSCF 125 uploads user information from application server 127 and/or an HSS; handles SIP registrations, allowing S-CSCF 125 to bind a user address and a SIP address; decides which application server the SIP message is forwarded to; etc.

As described above, mobile device 101 includes a plurality of personas. A persona is a particular use or application of the mobile device, and is represented by a different set of features, such as an interface, applications, and personalized settings. For instance, one persona can be used to communicate with friends, and another persona can be used to communicate with family members, while a third persona is used to communicate with business contacts, etc. To accomplish this, mobile device 101 is provided with a software/application that enables a user to load a different interface for each of the personas. The application further includes a connection manager to send and receive connection requests to and from each of the personas. Mobile device 101 also includes a configuration manager to enable a user of mobile device 101 to edit the plurality of rules located in the database of application server 127.

Incoming connection requests addressed to a telephone number associated with mobile device 101 are routed to a specific persona on mobile device 101 based on the rules stored in application server 127. Application server 127, or another server in IMS 120 (such as a call session control function CSCF, or equivalent) sets up a connection with a particular persona on mobile device 101. This new connection request may be displayed on a screen/display of mobile device 101, via the call manager, and an action is required by the user. For instance, a telephone call dialed to a personal number is correlated at the application server 127 with a contact associated with a "personal" persona of mobile device 101. A prompt is displayed on mobile device 101 identifying the calling party, the dialed number, and the option to load the "personal" persona to accept the call. Any service charges associated with the call are billed by billing server 131 to the account containing the personal persona. Similarly, outgoing connection requests transmitted from mobile device 101 may be sent from the current persona in use, or by a persona associated with the destination address, according to rules on application server 127. The system routes the outgoing call or message according to the persona used. Remote device 141 or 143 receives the connection request as being generated from a telephone number or address associated with the persona used by mobile device 101.

According to embodiments of the invention, backend systems segregate the user's accounts in terms of billing, etc. If the user makes personal calls, the business won't be billed and business won't be able to see the call. Any calls made under a persona under a number are billed to that number. Alternatively, the system may make a determination of who to bill based on a contact that is being called.

Not shown in the above system are elements that are standard in IMS networks and will be known to those skilled in the art. For instance, one or more home subscriber servers (HSS), an Interrogating Call Session Control Function (I-CSCF), additional gateways, application servers, proxy servers, etc. can be present but are not shown for the sake of clarity. An HSS may contain a master user database that supports the IMS network entities that handle calls. The HSS may contain subscription-related information, may perform authentication and authorization of the user, and can provide information about the subscriber's location and IP information. Thus, the HSS may provide similar functions to a Home Location Register (HLR) and an Authentication Center (AuC) of a GSM network. The I-CSCF is a SIP function located at the edge of an administrative domain. Remote servers may find the I-CSCF and use the I-CSCF as a forwarding point for SIP packets to the administrative domain. The I-CSCF may query the HSS to retrieve the address of the S-CSCF and assign the S-CSCF to a user performing SIP registration. Moreover, it should be noted that only minimal modifications need to be done to the system in order to enable the present invention. Particularly, a mobile device is provided with a connection manager to send and receive calls, a configuration manager to remotely provision the rules, and a plurality of interfaces corresponding to a plurality of personas. Additionally, an application server on the IMS network hosts the rules, and contains a plurality of logical units for handling the various tasks required.

Figure 2:
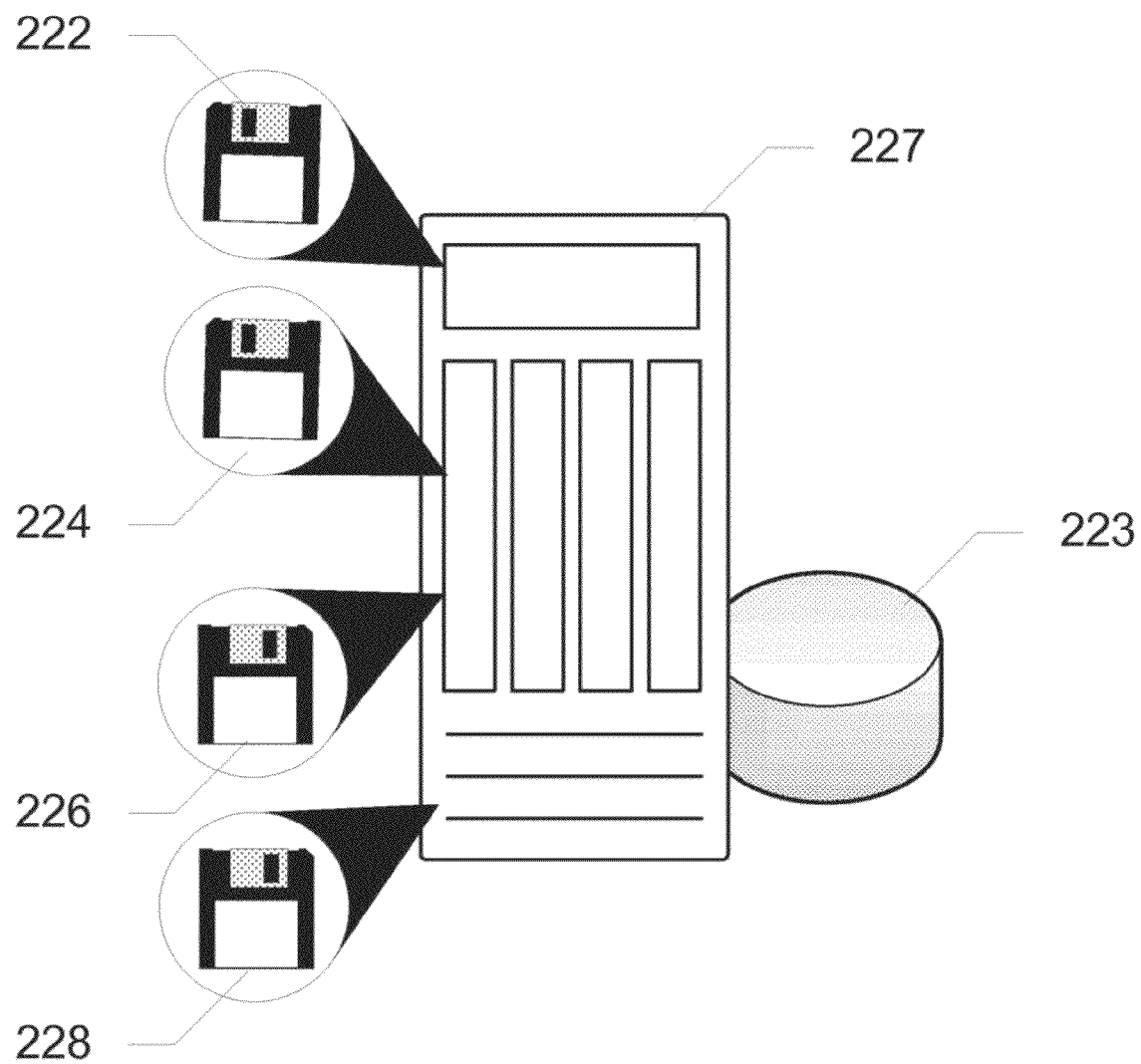
FIG. 2 shows an application server for routing connections to and from a plurality of personas on a mobile device, according to an exemplary embodiment of the present invention.

FIG. 2 shows an application server 227 for routing connection requests to and from a plurality of personas on a mobile device, according to an exemplary embodiment of the present invention. Application server 227 is located on a network and is for routing a connection request to a mobile device on the network, with the mobile device having a unique network address. Application server 227 includes a processor (not shown), a memory in communication with the processor (not shown), a database 223 on the memory, and logic units 222, 224, 226, and 228 stored on the memory. Database 223 includes a record for the mobile device. The record includes one or more telephone numbers corresponding to the mobile device and one or more personas corresponding to each of the telephone numbers. Database 223 further includes a plurality of rules for call handling for each persona. The plurality of rules determines which contacts are associated with which personas, as well as information on groups of contacts. Further, the plurality of rules determines which services/features should be invoked in handling the incoming connection request. For instance, the rules determine the call should be directed straight to voicemail at a specific time, forwarded to another number, blocked, etc. The plurality of rules may be adjusted by the user via a configuration manager on the mobile device. Consequently, the rules enable dynamic updating of these features, for instance, when the user wishes not to be disturbed, he can set all incoming connections to be routed to voicemail. The determination of the persona and the applying of services/treatments based on the determined persona may be done by application server 227 or may be accomplished by separate application servers.

Logic units 222, 224, 226 and 228 enable application server 227 to receive a connection request from a remote device on the network, determine that the destination for the connection request is the mobile device, activate one or more services in response to the connection request, associate a persona with the connection request, and initiate a session between the remote device and the associated persona on the mobile device. The logic includes routing logic 222, updating logic 224, session initiation logic 226, and a billing logic 228. Routing logic 222 implements the rules stored on database 223 with respect to each of the personas on the mobile device. This includes receiving incoming or outgoing connection requests, referring to rule database 223, and applying the appropriate rules to route the connection request. Updating logic 224 updates the rules as per a network operator or a user associated with the mobile device. Updating logic 224 may provide an interface enabling updates to be performed using an application on the mobile device, by an application on a computer connected to the internet, may be learned according to previously chosen associations, etc. Updating logic 224 can further monitor the usage patterns of each persona, and update rule database 223 automatically and dynamically based on the monitored patterns. Session initiation logic 226 initiates connections between devices on the network. As described above, this can include commanding a CSCF or other entity to initiate the session. Session initiation logic 226 can further include security features so as to create secure IP tunnels, encrypt traffic, etc. Finally, billing logic 228 ensures that each incoming or outgoing call/message/service is associated with the correct account for billing. The association of the persona with the connection request is performed by referring to rules database 223. Similarly, when a user of the mobile device generates an outgoing connection request associated with a persona, application 227 server associates the outgoing connection request with the telephone number corresponding to the persona. Application server 227 initiates a session between the associated persona on the mobile device and a destination remote device using session initiation logic 226. Application server 227 can further instruct the mobile device to load the associated persona before initiating the session.

The remote device may be another mobile device, a landline device on a PSTN, an IP network wherein the incoming connection request is a VoIP call, etc. The connection request may be for a telephone call, a text message, a multimedia message, an e-mail, a VoIP call, etc. The connection request can also be a data transfer request with another IP-enabled network entity such as a web server or a peer-to-peer session. According to embodiments of the invention, the network is an IP Multimedia Subsystem (IMS) network wherein sessions are initiated using the Session Initiation Protocol (SIP). The session may be, for instance, an IPSec session. Other combinations will become apparent to one of ordinary skill in the art in light of this disclosure.

Figure 3:
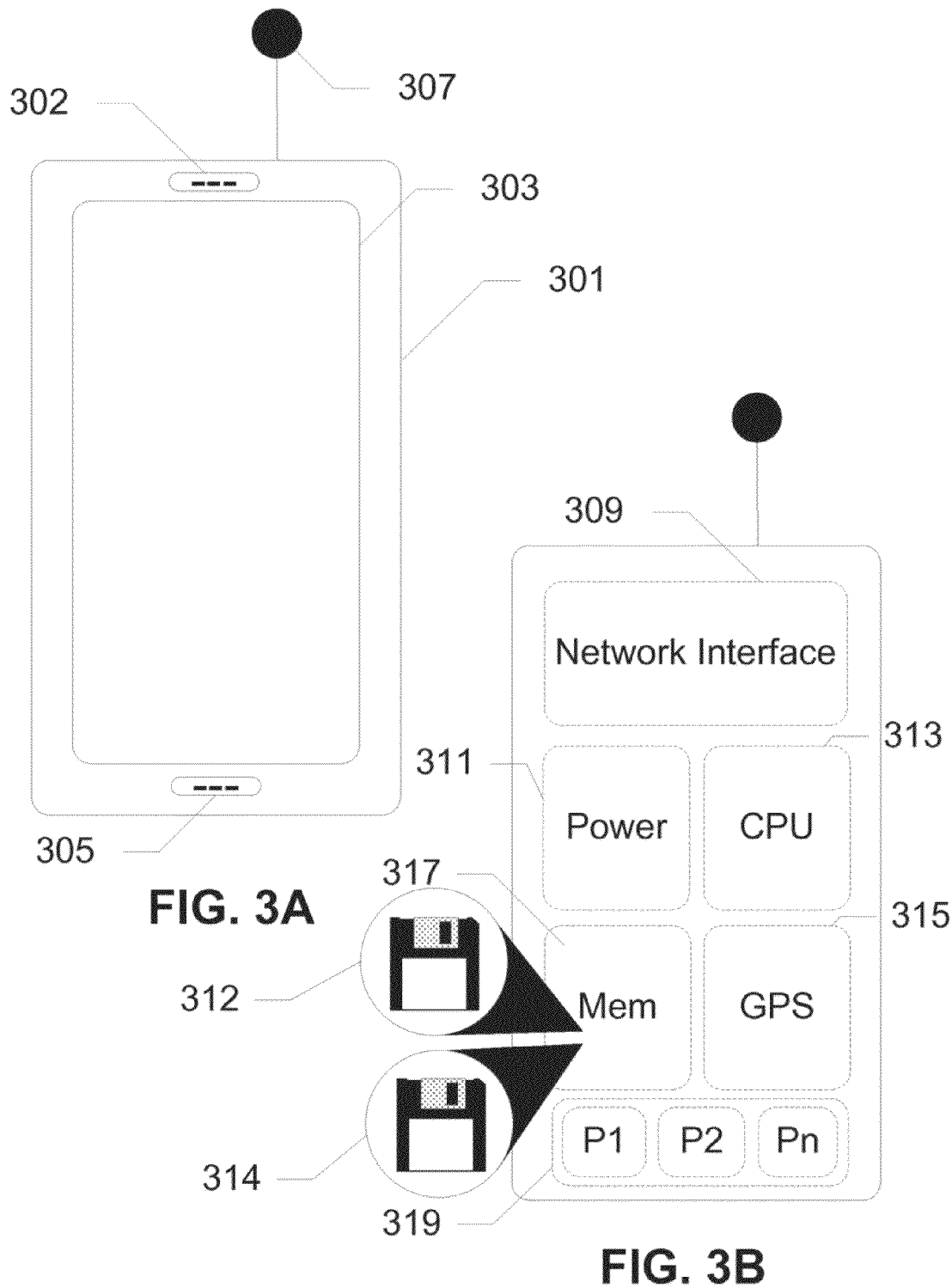
FIGS. 3A and 3B respectively show the exterior and interior components of a mobile device having multiple personas, according to an exemplary embodiment of the present invention.

FIGS. 3A and 3B respectively show the exterior and interior components of a mobile device 301 having multiple personas, according to an exemplary embodiment of the present invention. According to this embodiment, mobile device 301 includes a speaker 302, a display 303, a microphone 305, and an antenna 307. Mobile device 301 further includes a network interface 309, a power supply 311, a central processing unit (CPU) 313, a GPS transceiver 315, and a memory 317. Speaker 302 provides an audio output for mobile device 301. Display 303 is an LCD or LED or other type of display on which a user can view selections, numbers, letters, etc. Display 303 can also be a touchscreen, thereby being used as an input device. In embodiments not using a touchscreen, a keypad is typically used as an input device, for instance, to type a phone number or a message. Such a keypad may be a numerical keypad, a QWERTY keyboard, etc. Microphone 305 allows the user to verbally communicate with others using mobile device 301. Antenna 307 is a transducer designed to transmit or receive electromagnetic waves to and from a network. In conjunction with antenna 307, network interface 309 allows mobile device 301 to wirelessly communicate with a network, or with other wireless devices. Network interface 309 may be a cellular transceiver, wireless transceiver, etc., and includes combinations of transceivers to communicate with assorted wireless networks. Power supply 311 provides power to each of the components of mobile device 301, and can include a battery, as well as an interface to an external power supply. CPU 313 controls components of mobile device 301 according to instructions in logic stored on memory 317. Memory 317 comprises any computer readable medium, such as RAM, ROM, etc. Memory 317 stores applications and logic, including a connection manager 312 and a configuration manager 314, as well as logic for operating the components of mobile device 301. Memory 317 further stores a plurality of personas 319 for mobile device 301. GPS transceiver 315 may determine the location of mobile device 301. This location may be used in conjunction with rules on the application server, such as location-based rules. The location may also determine a persona to use, a telephone number to use, etc.

During operation of mobile device 301, connection manager 312 is loaded into memory 317 and can be used at any time to send and receive connection requests with a remote device on the network. Connection manager 312 is in direct communication with an application server on the network, and communicates with the application server in order to load or activate different personas based on the rules stored on the application server. For incoming requests, connection manager receives a connection request from the application server and prompts the user to accept the call using the associated persona. Either the user, or the device, can switch to the home screen/interface of the associated persona determined to be ideal for receiving the call based on the rules. For outgoing calls, the user selects from any one of the different home screens for each persona or each phone number associated with the mobile device. A call may be placed from any of the numbers associated with mobile device at any time. Alternatively, the connection manager/application server automatically determines the appropriate persona, and initiates the outgoing connection request from that persona. The called party sees the telephone number associated with the selected persona in their caller ID.

Configuration manager 314 allows the user to read the current configuration of personas and make changes. For instance, configuration manager 314 allows the user to change which contacts are on which persona list, which personas the user wishes to accept calls from and at which times, forwarding features for personas, etc. According to embodiments of the invention, configuration manager 314 or the network may learn associations based upon the actions of the user in certain situations. Such a learning mode may be turned on or off according to the desires of the user. Configuration manager 314 may be integrated with an address book. Such integration may assist in the automated switching of personas.

Applications on the mobile device may be partitioned between personas. This may alleviate the concern for the accidental exchange of data between personas. The partitioning of the personas may be accomplished by utilizing separate virtual machines on the mobile device for each persona or each distinct telephone number and associated personas. This may ensure the segregation of data between personas.

The telephone numbers on the mobile device may be handled completely separately on the network in terms of activation, billing, etc. Thus, one telephone number may be disabled while others still remain. For instance, even if the work telephone number is disabled, the user may continue to use the device and system for his or her personal and seller telephone numbers.

Figure 4:
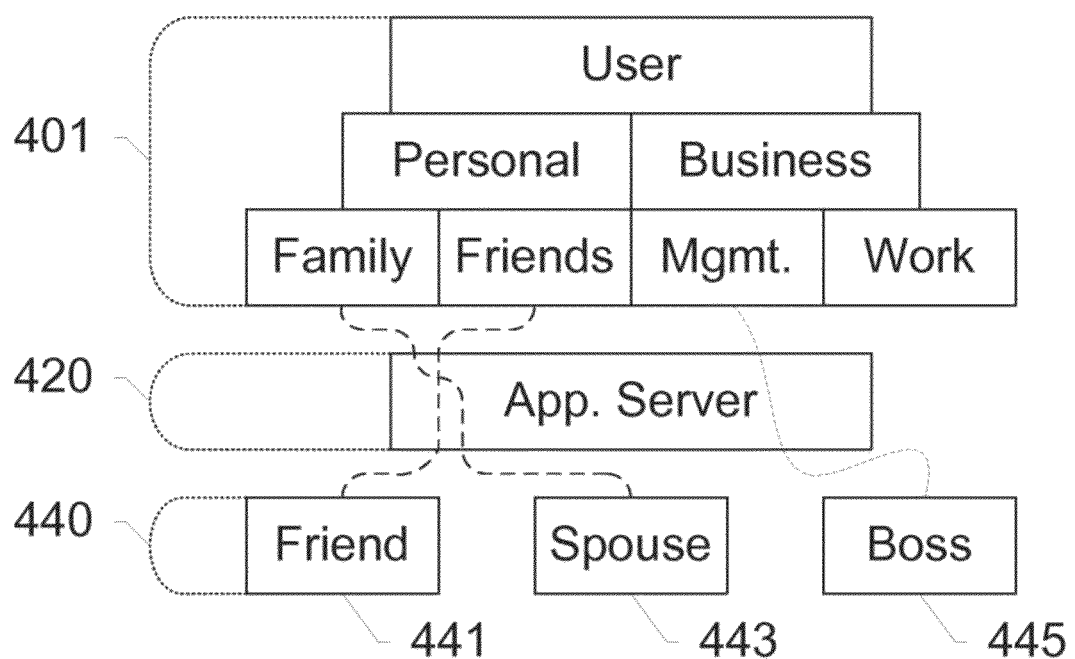
FIG. 4 shows connections being routed from remote devices to a persona on a mobile device via a network server, according to an exemplary embodiment of the present invention.

FIG. 4 shows connections being routed from remote devices to a persona on a mobile device via a network server, according to an exemplary embodiment of the present invention. A single mobile device 401 may be associated with more than one account (personal and business), each account being charged and billed separately. Further, each account may be associated with multiple telephone numbers that can be chosen for outgoing calls from mobile device 401 or be called from anywhere in the telephone network and be routed to the mobile device 401. Each of the phone numbers may have one or more network treatments or personas based on the other party to the call. In this case, the personas include Family and Friends (under the Personal account) and Management and Work (under the Business account). When mobile device 401 registers with a network 420, network 420 is aware of all the personas for mobile device 401. An application server on network 420 includes a database of rules/settings for the personas that can be defined by the user. The user may change which personas allow calls to come through to mobile device 401 and from which contacts, which calls go directly to voice mail, which calls are forwarded, etc. The user may assign services separately to each of the personas. All of these treatments can be accessed and controlled from mobile device 401 using a configuration manager. Thus, mobile device 401 may be used with a plurality of telephone numbers, each with a plurality of personas.

Within the user's personal telephone number, the friends persona includes rules for friends of the user, while the family persona contains rules for family members. These rules may be set according to the desires of the user. For instance, the user may want incoming calls from friend 441 to be routed to the Friend persona, while family members are routed to the Family persona. Further rules can be invoked, for instance, at a specific time of the day, incoming connection requests from Friend 441 are routed straight to a message inbox (voicemail, etc.) while calls from Spouse 443 and Boss 445 ring through to the appropriate persona. The user sets the rules for the personal persona according to these desires and tags or otherwise adds friends to the personal persona. Family members are tagged or otherwise added to the family persona with the rules of the family persona set accordingly.

Other accounts are possible, such as an EBAY seller account, GOOGLE ADWORDS account, or other specialized communications. A seller persona may be used, for instance, for posted sales where incoming callers may be unknown to the user. As the seller identity may not contain any tagged contacts, all incoming calls may be treated the same, that is, according to the same rules. For instance, all calls to the seller telephone number may ring through. Further, the seller telephone number may be a separate telephone number on the user's personal account. Thus, billing for the seller telephone number may be included with the billing for the personal telephone number as separate numbers need not be associated with separate accounts.

The work telephone number may include a work persona and a manager persona. Thus, general calls to the work telephone number may be treated one way while calls from a manager to the work number are treated differently, such as ringing through. For instance, during the week, between 12:00 PM and 1:00 PM calls to the work identity are forwarded to the user's assistant, unless the call is from the user's boss 445, in which case the call rings through to the Work persona. During the week from 5:00 PM to 8:00 AM and during the weekend, calls to the work telephone number are routed directly to the user's work voice mail, unless the call is from boss 445, in which case the call rings through.

A network configuration application on the mobile device lets the user turn his or her availability on or off for each persona according to a schedule, or on-demand. When the user's availability is on for a persona, calls to that persona ring through to the mobile device. The settings are sent from the mobile device to the IMS network for appropriate call routing.

Figure 5:
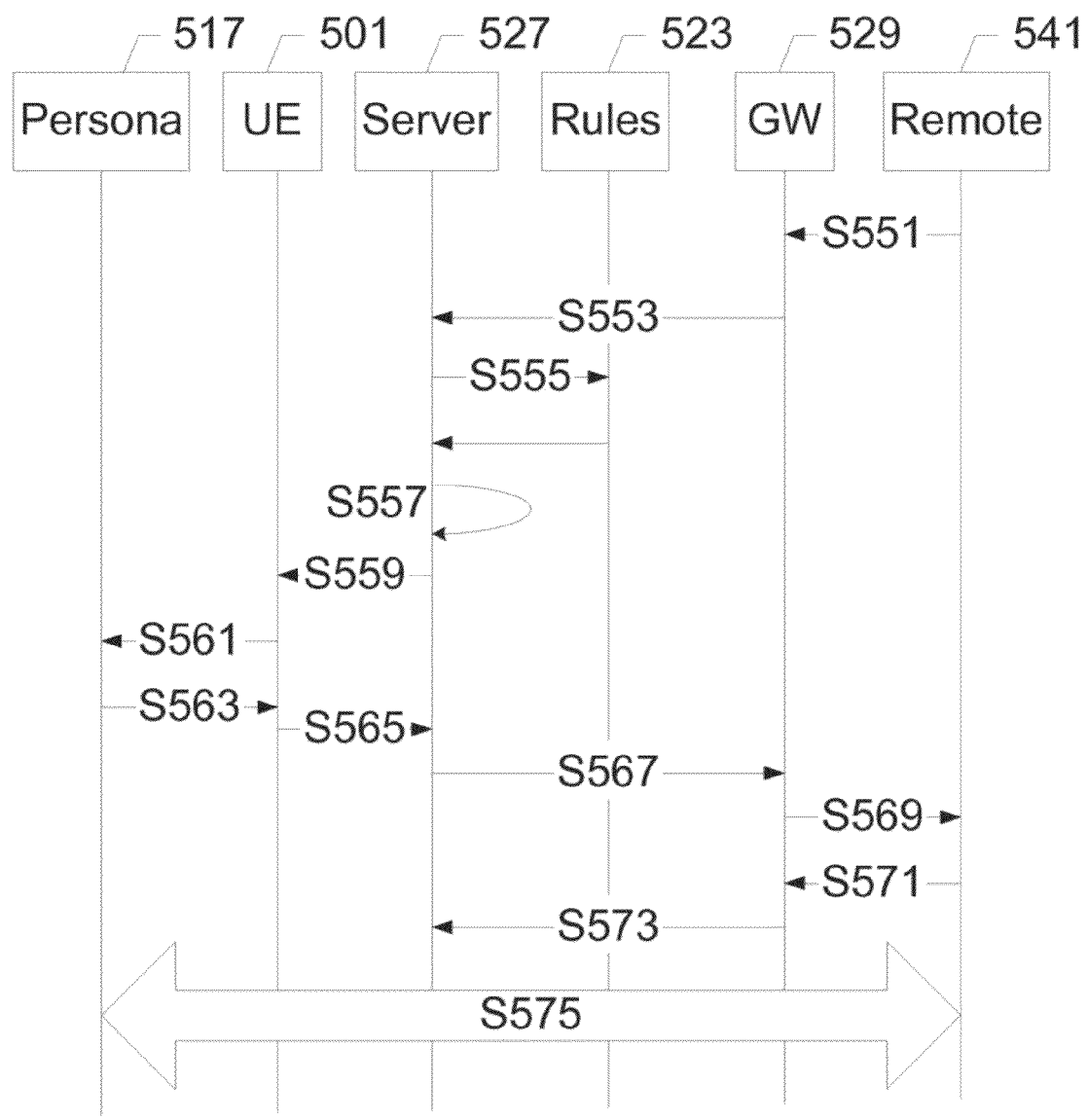
FIG. 5 shows a method for routing incoming connection requests to a mobile device having a plurality of personas, according to an exemplary embodiment of the present invention.

FIG. 5 shows a method for routing incoming connection requests to a mobile device having a plurality of personas, according to an exemplary embodiment of the present invention. A mobile device, also known as a User Equipment (UE) 501 includes one persona 517 (of a plurality of personas), and is in communication with a server 527 including rule database 523 and a gateway 529 that provides communication with a remote device 541. At least UE 501, server 527, and gateway 529 are SIP-enabled, i.e. they can directly communicate using SIP signaling over internet protocol (IP). Further, the SIP stack on UE 501 includes persona 517 having its own SIP identity and can assert and process a SIP identity associated with persona 517.

The method begins with a connection request S551 being received at the gateway 529 from remote device 541, requesting a telephone number to connect with UE 501. The incoming connection request may be a phone call from a PSTN network, or a connection request from an IP network. In either case, the connection request is forwarded S533 via IP to server 527 at which point it is processed to determine the fate of the connection request. Server 527 refers S555 to rules 523 to determine which rules apply. This determination S555 can be based on the identity of remote device 541, the destination telephone number, as well as time of day, location of UE 501 (as determined by GPS or other technology), etc. The rules are then applied S557 to determine the fate of the incoming connection request. If the connection request is not destined to voicemail, forwarding, or call blocking, then the connection request is transmitted to the associated persona at UE 501. Step S559 instructs the UE to load up the specific persona, either via connection manager on UE 501 or some other method. UE 501 loads up persona 517 in step S561. This can also include a prompt for the user of UE 501 to answer the incoming request. Upon answering, the response is transmitted S563 back to UE 501, and to server 527 in step S565. This "accept" response traverses the network elements in steps S567-S569 and reaches remote device 541. Remote device 541 acknowledges the response S571, and the acknowledgement is transmitted from gateway 529 to server 527, whereupon the session initiation logic on server 527 enables a path to be set up between persona 517 on UE 501, and remote device 541. If remote device 541 is IP enabled, the connection S575 may be a real-time transport protocol (RTP) session for multimedia transfer, or a secure IP tunnel, or a VoIP stream. Alternatively, it could just be a voice call, or a data transfer.

Figure 6:
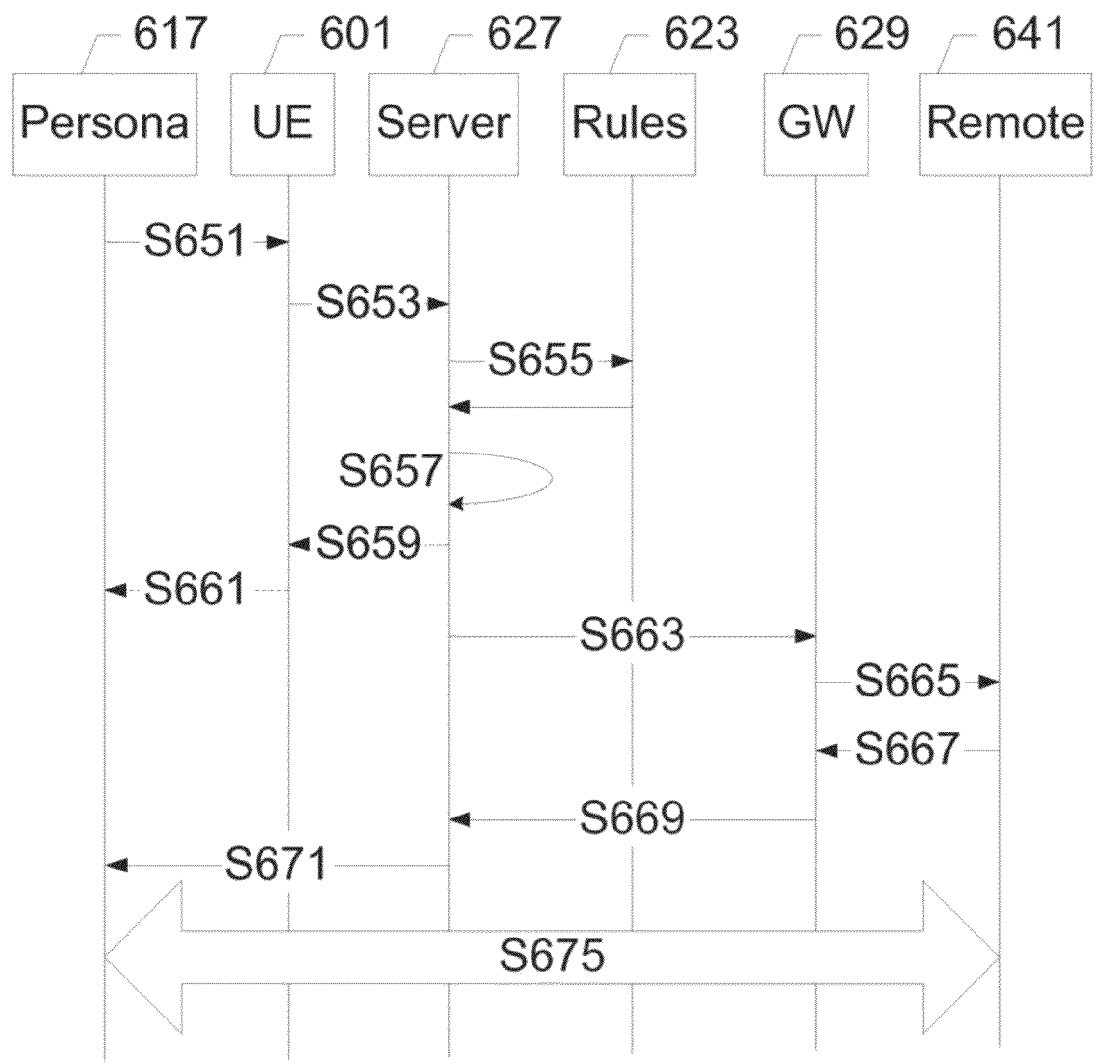
FIG. 6 shows a method for routing outgoing connection requests from a mobile device having a plurality of personas, according to an exemplary embodiment of the present invention.

FIG. 6 shows a method for routing outgoing connection requests from a mobile device having a plurality of personas, according to an exemplary embodiment of the present invention. A mobile device, also known as a User Equipment (UE) 601 includes one persona 617 (of a plurality of personas), and is in communication with a server 627 including rule database 623 and a gateway 629 that provides communication with a remote device 641. At least UE 601, server 627, and gateway 629 are SIP-enabled, i.e. they can directly communicate using SIP signaling over internet protocol (IP). Further, the SIP stack on UE 601 includes persona 617 having its own SIP identity.

The method begins with a connection request S651 being generated by persona 617 and invoking connection manager on UE 601. The connection manager on UE 601 transmits the connection request to server 627 on the IMS network, at which point it is processed S655 using rules 623. Server 627 refers S655 to rules 623 to determine how to bill the call, and if the appropriate persona is being used to communicate with the destination remote device 641. This determination S655 is optional, and can be bypassed if the user is permitted to make calls from any persona 617 on UE 601. However, the added functionality can be helpful to streamline the process for a user who chooses to make an outgoing connection request from a persona that he is already working with, rather than manually switch personas, or if the user wants network rules to determine the outgoing persona. At this point, server 627 continues to transmit the outgoing connection request to remote device 641 across gateway 629. The request traverses the network S663 and arrives at remote device 641 (S665), at which point it is accepted or rejected. If accepted, the acceptance is transmitted S667 back to gateway 629, forwarded S669 to server 627, which notifies persona 617 that the connection was accepted. The session initiation logic on server 627 enables a path to be set up between persona 617 on UE 601, and remote device 641. If remote device 641 is IP enabled, the connection S675 may be a real-time transport protocol (RTP) session for multimedia transfer, or a secure IP tunnel, or a VoIP stream. Alternatively, it could just be a voice call, or a data transfer.

Figure 7:
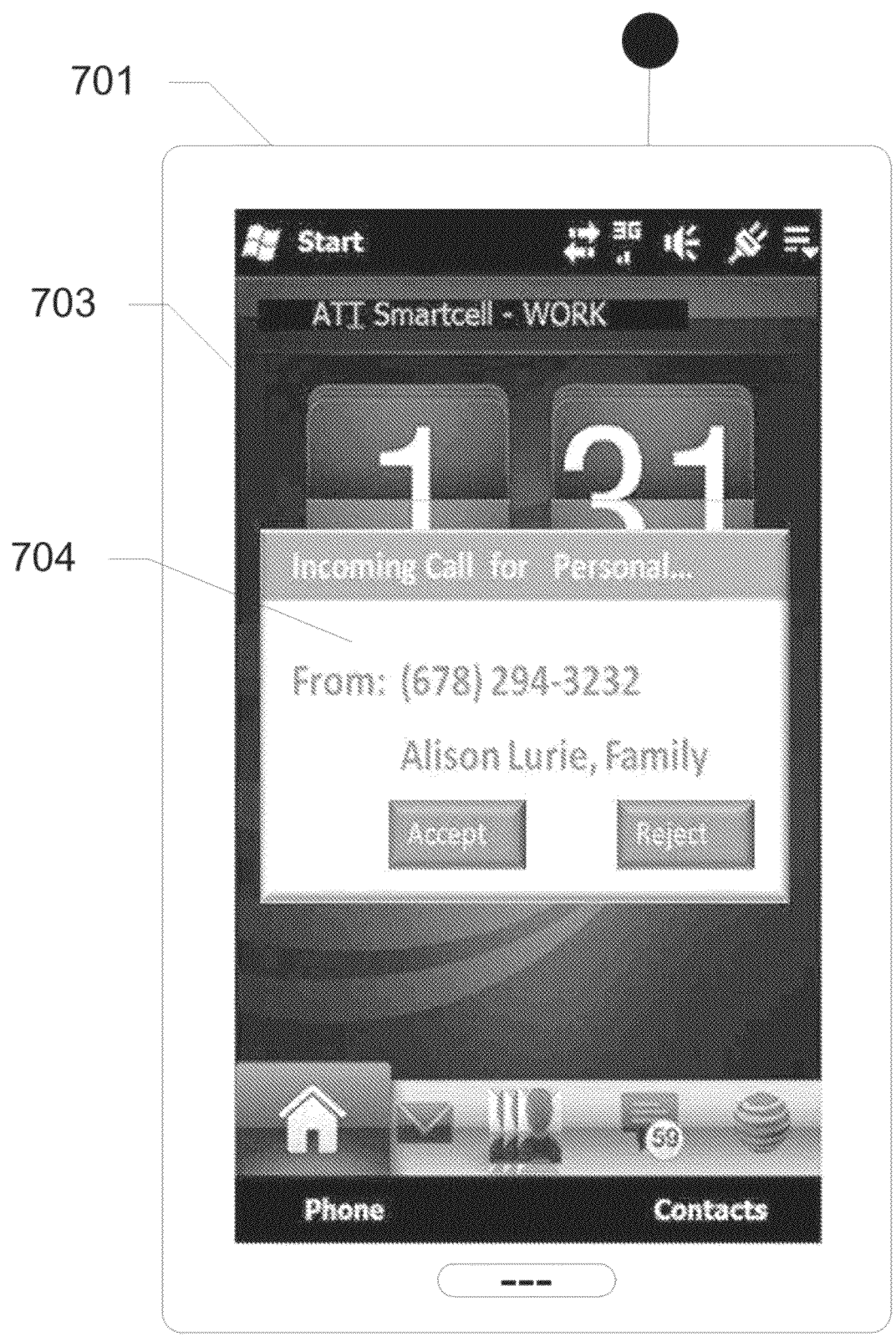
FIG. 7 shows a screenshot of an incoming call to a mobile device, according to an exemplary embodiment of the present invention.

FIG. 7 shows a screenshot of an incoming call to a mobile device 701, according to an exemplary embodiment of the present invention. A user of mobile device 701 is notified of the call on a display 703 of mobile device 701. In this embodiment, the user is currently using a work persona on mobile device 701. The incoming call causes mobile device 701 to display a prompt 704 on display 703. Prompt 704 notifies the user of the persona receiving the incoming call, the telephone number of the caller, the name of a contact associated with the incoming call, and a grouping for the contact. For example, the incoming call is directed to the user's personal persona from a family member. Prompt 704 also allows the user to accept or reject the incoming call. By accepting the call, the user is switched to the personal persona on mobile device 701 and the call is connected. Any billing for the call is directed to the user's personal account. If the user rejects the call, the call may be sent to voicemail, forwarded, etc. based upon rules stored by the application server on the network.

Figure 8:
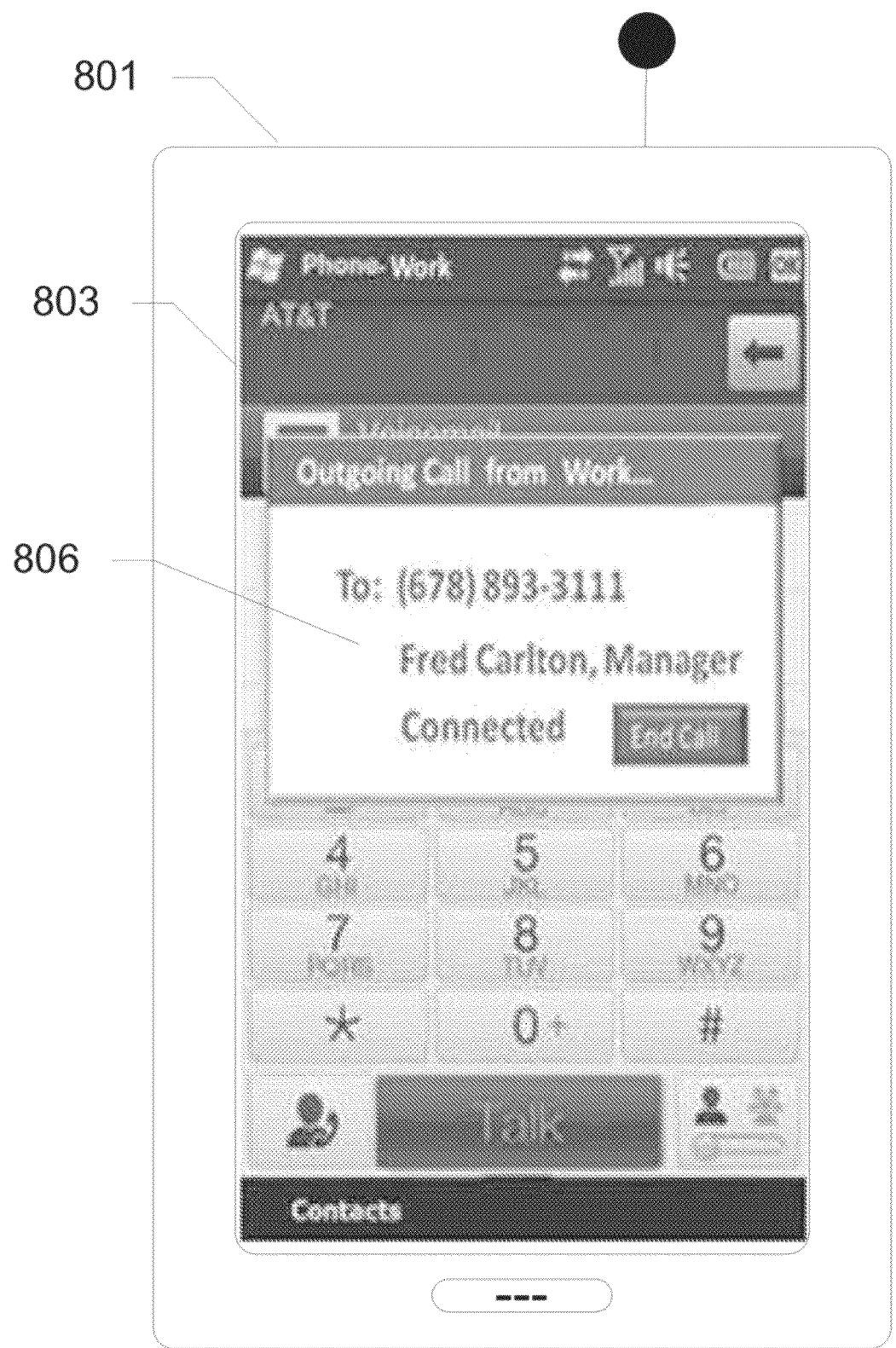
FIG. 8 shows a screenshot of an outgoing call being placed by a mobile device, according to an exemplary embodiment of the present invention.

FIG. 8 shows a screenshot of an outgoing call being placed by a mobile device 801, according to an exemplary embodiment of the present invention. In this embodiment, a user receives a prompt 806 on display 803 with the details of a call that is currently outgoing. As the user is currently using his or her work persona, and has selected a contact while using the work persona, the outgoing call is placed from the telephone number associated with the work persona. The prompt includes an option to end the outgoing call.

In alternative embodiments, the outgoing call may be placed by a persona based upon the categorization of the contact with respect to the personas of the mobile device. For instance, if the user is currently using the work persona, but selects the contact for the user's spouse, who is associated with the personal persona, the call is made from the personal persona and thus the personal telephone number. In other embodiments of the present invention, contacts are segregated by persona such that in the above example the user would first have to switch to the personal persona to select the spouse contact.

Figure 9:
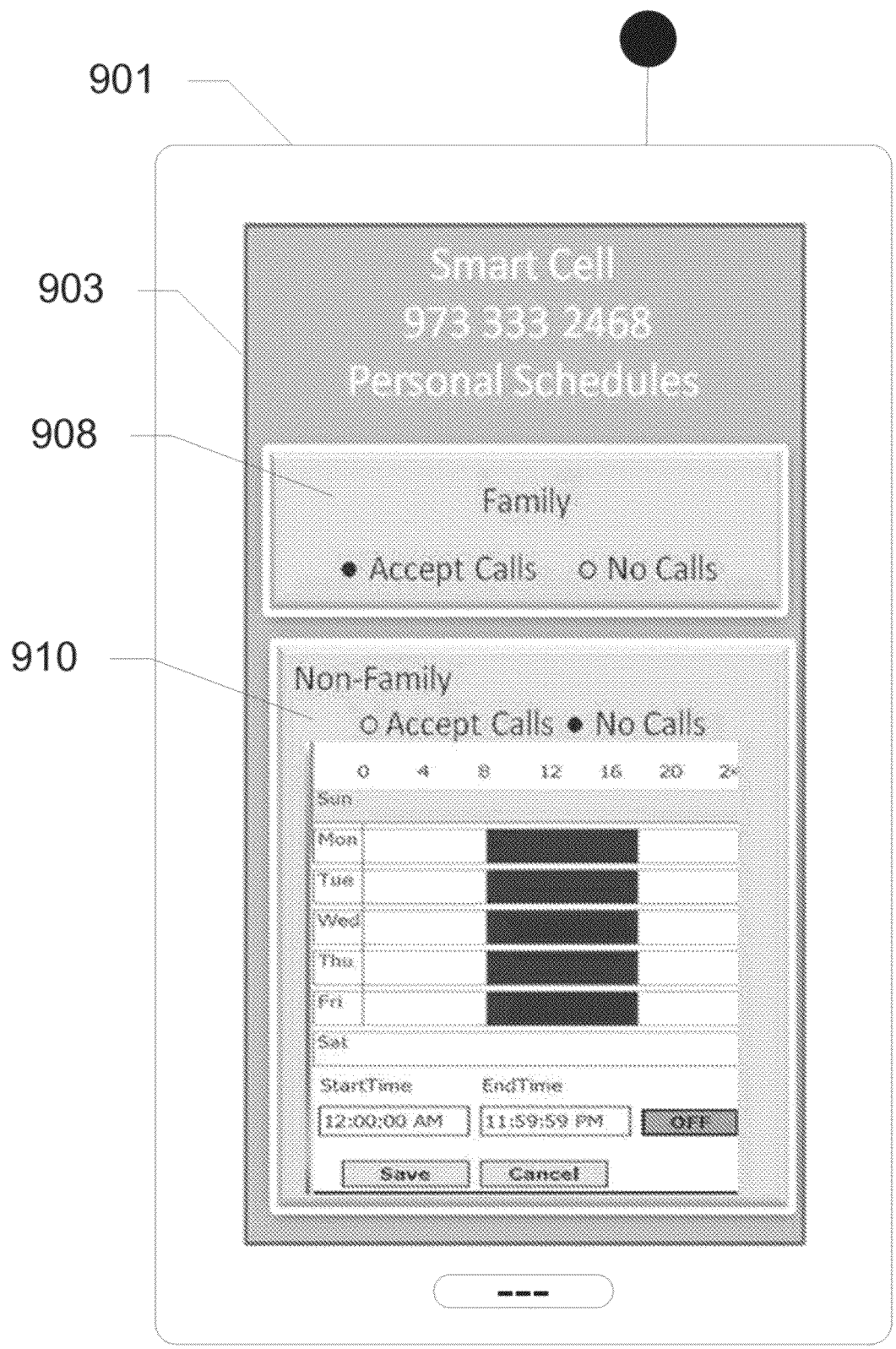
FIG. 9 shows a configuration manager application on a mobile device, according to an exemplary embodiment of the present invention.

FIG. 9 shows a configuration manager application on a mobile device 901, according to an exemplary embodiment of the present invention. In this embodiment, the configuration manager application displays the telephone number and name of the persona being set on display 903. The configuration manager allows the user to divide contacts for the current persona into groups, in this case family 908 and non-family 910. When "accept calls" has been chosen for the group, such as shown for family 908, calls are accepted from the group. When "no calls" is chosen, such as shown for non-family 910, the user may choose time periods when this group may not contact the user, and may be directed to voicemail, forwarded, etc. The changes to the settings may be saved or cancelled using a save button or a cancel button respectively. Information about the different handling of groups is kept on the network on a server and referenced by the network.

Figure 10:
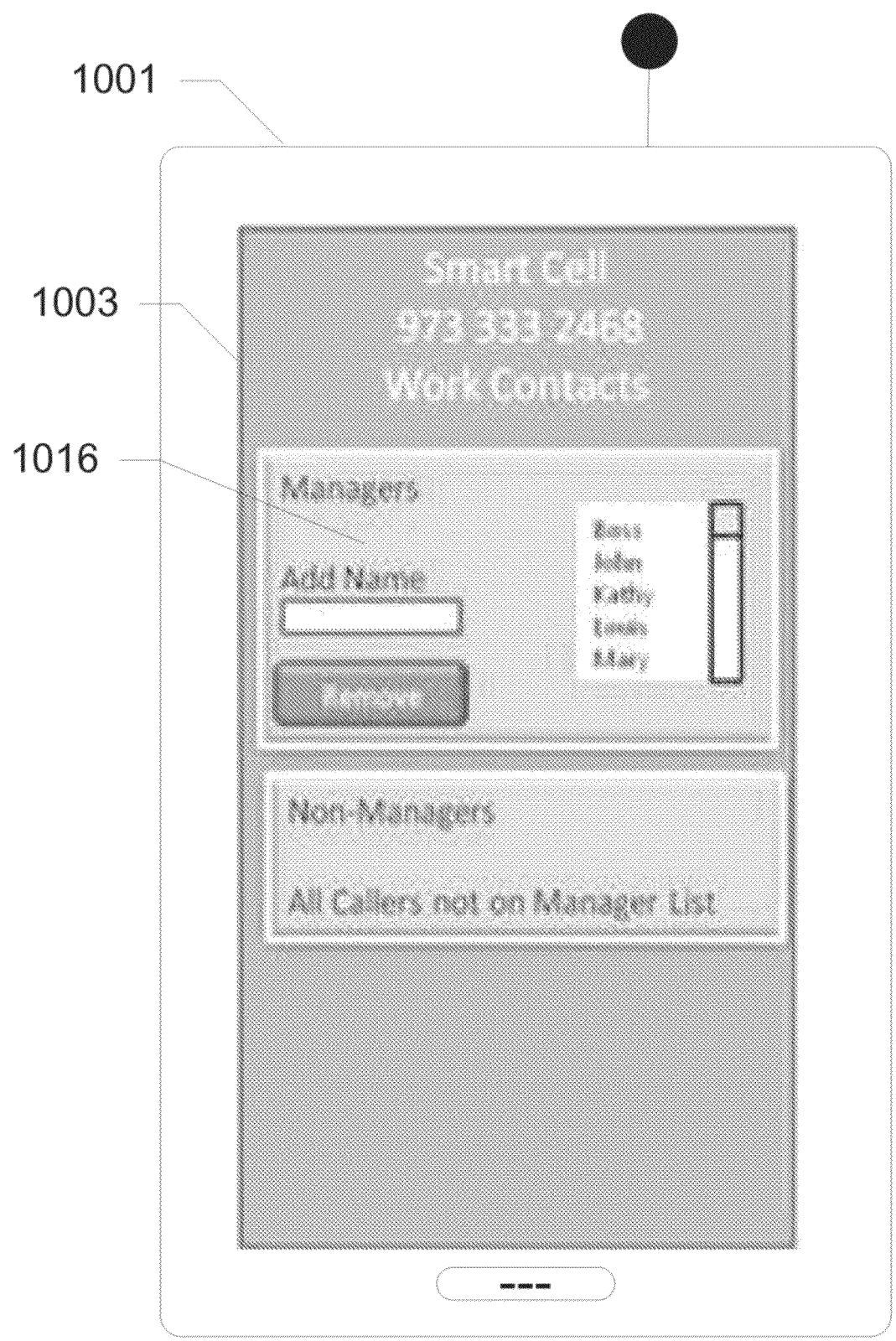
FIG. 10 shows a configuration manager application creating a group on a mobile device, according to an exemplary embodiment of the present invention.

FIG. 10 shows a configuration manager application creating a group on a mobile device 1001, according to an exemplary embodiment of the present invention. In this embodiment, the configuration manager application allows the user to select contacts to add or remove from a group with display 1003. As shown, the user has divided work contacts into managers and non-managers and is creating a manager group 1016. The user adds certain work contacts to manager group 1016 with the remaining work contacts becoming the non-manager group. The groups shown are only an example and contacts can be divided into any name or any number of groups.

Figure 11:
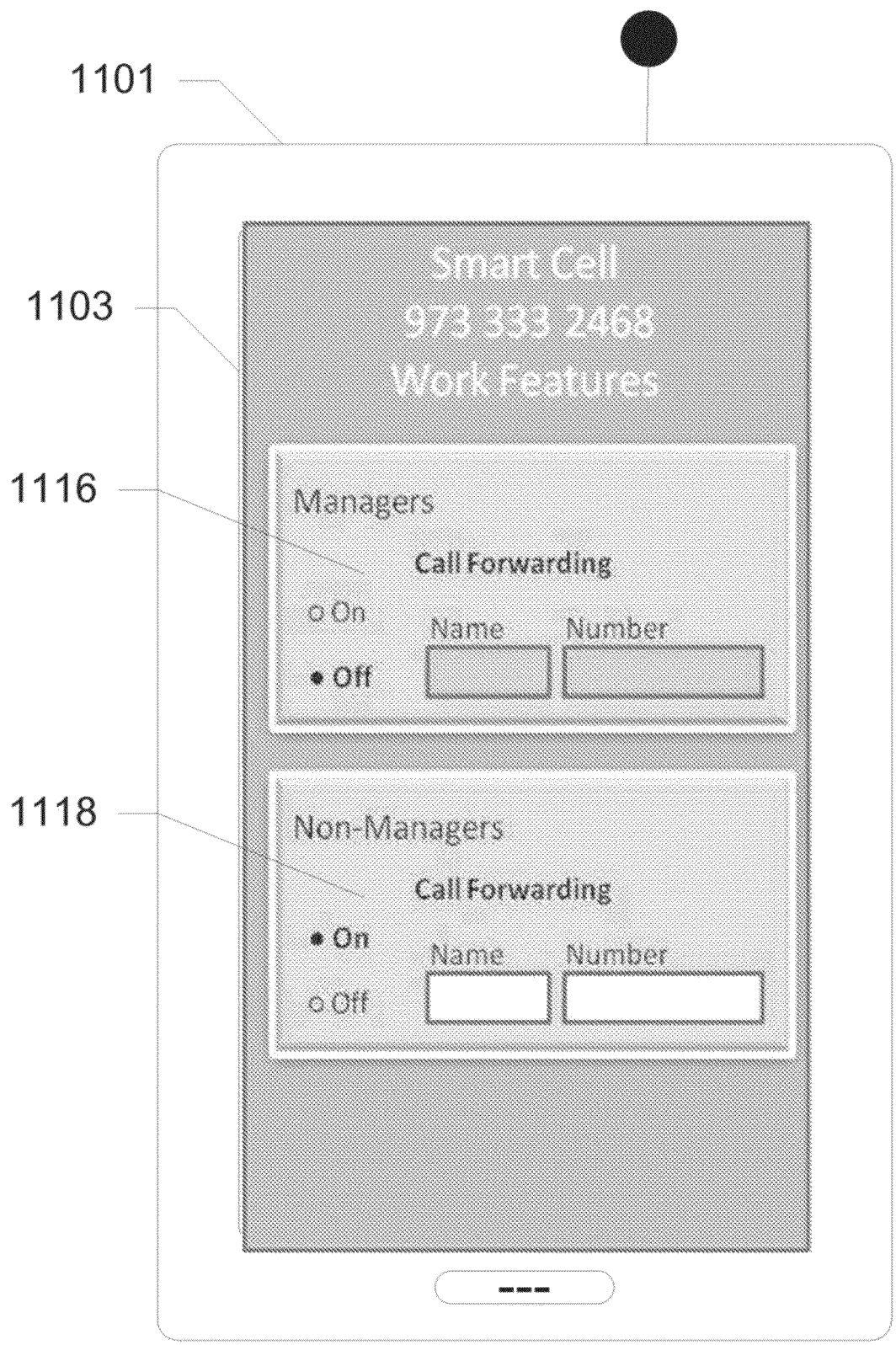
FIG. 11 shows a configuration manager application setting features of a mobile device, according to an exemplary embodiment of the present invention.

FIG. 11 shows a configuration manager application setting features of a mobile device 1101, according to an exemplary embodiment of the present invention. In this embodiment, the configuration manager application is being used to set call forwarding features for the work persona of mobile device 1101 on display 1103. The contacts of the work persona are again divided into a managers group 1116 and a non-managers group 1118. For managers group 1116, the call forwarding feature has been turned off. Thus, calls from contacts in managers group 1116 ring through to mobile device 1101. For non-managers group 1118, the call forwarding feature has been turned on. The user enters a telephone number and/or name of a contact to forward calls from non-managers group 1118 to.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A server comprising:
a processor; and
a memory storing instructions that, when executed by the processor, cause the processor to perform operations comprising:
receiving, from a first remote device via a network, a first connection request directed to a mobile device,
accessing information about the mobile device, the information comprising a first destination number corresponding to the mobile device and a second destination number corresponding to the mobile device, the first destination number associated with a first persona and a first billing account and the second destination number associated with a second persona and a second billing account, and the first persona associated with a first rule for handling connection requests directed to the mobile device and the second persona associated with a second rule for handling connection requests directed to the mobile device, determining, based on an identity of the first remote device, that the first remote device is associated with the first persona, and in response to determining that the first remote device is associated with the first persona, transmitting the first connection request to the mobile device based on the first rule associated with the first persona to initiate a first session between the mobile device and the first remote device, and associating the first session with the first billing account such that the first billing account is billed for the first session.

2. The server of claim 1, wherein the first session is initiated using a session initiation protocol.

3. The server of claim 2, wherein the first remote device is on a public switched telephone network, and wherein the first connection request is for a telephone call.

4. The server of claim 3, wherein receiving the first connection request from the first remote device is by way of a gateway.

5. The server of claim 1, wherein the operations further comprise:

receiving, from the mobile device, an outgoing connection request to a second remote device;

determining, based on an identity of the second remote device, that the second remote device is associated with the second persona; and transmitting the outgoing connection request to the second remote device to initiate a second session between the mobile device and the second remote device, wherein the outgoing connection request is associated with the second destination number corresponding to the mobile device based on determining that the second remote device is associated with the second persona.

6. The server of claim 5, wherein the operations further comprise associating the second session with the second billing account such that the second billing account is billed for the second session.

7. The server of claim 1, wherein the first session billed to the first billing account is not visible to the second billing account.

8. The server of claim 1, wherein the first destination number is also associated with a third persona, the third persona associated with a third rule for handling connection requests directed to the mobile device, and wherein the operations further comprise:

receiving, via the network, a second connection request from a second remote device;

determining, based on an identity of the second remote device, that the second remote device is associated with the third persona;

determining, at least based on determining that the second remote device is associated with the third persona, to route the second connection request based on the third rule for handling connection requests directed to the mobile device; and routing the second connection request based on the third rule for handling connection requests directed to the mobile device, wherein routing the second connection request based on the third rule comprises routing the second connection request to a message inbox associated with the mobile device.

9. The server of claim 8, wherein determining to route the second connection request based on the third rule for handling connection requests directed to the mobile device is further based on a time of day when the second connection request is received.

10. A non-transitory computer readable medium storing instructions that, when executed by a processor, cause the processor to perform operations comprising:

receiving, from a first remote device via a network, a first connection request directed to a mobile device;

accessing information about the mobile device, the information comprising a first destination number corresponding to the mobile device and a second destination number corresponding to the mobile device, the first destination number associated with a first persona and a first billing account and the second destination number associated with a second persona and a second billing account, and the first persona associated with a first rule for handling connection requests directed to the mobile device and the second persona associated with a second rule for handling connection requests directed to the mobile device;

determining, based on an identity of the first remote device, that the first remote device is associated with the first persona; and in response to determining that the first remote device is associated with the first persona, transmitting the first connection request to the mobile device based on the first rule associated with the first persona to initiate a first session between the mobile device and the first remote device, and associating the first session with the first billing account such that the first billing account is billed for the first session.

11. The non-transitory computer readable medium of claim 10, wherein the operations further comprise:

receiving, from the mobile device, an outgoing connection request to a second remote device;

determining, based on an identity of the second remote device, that the second remote device is associated with the second persona; and transmitting the outgoing connection request to the second remote device to initiate a second session between the mobile device and the second remote device, wherein the outgoing connection request is associated with the second destination number corresponding to the mobile device based on determining that the second remote device is associated with the second persona.

12. The non-transitory computer readable medium of claim 11, wherein the operations further comprise associating the second session with the second billing account such that the second billing account is billed for the second session.

13. The non-transitory computer readable medium of claim 10, wherein the first session billed to the first billing account is not visible to the second billing account.

14. The non-transitory computer readable medium of claim 10, wherein the first destination number is also associated with a third persona, the third persona associated with a third rule for handling connection requests directed to the mobile device, and wherein the operations further comprise:

receiving, via the network, a second connection request from a second remote device;

determining, based on an identity of the second remote device, that the second remote device is associated with the third persona;

determining, at least based on determining that the second remote device is associated with the third persona, to route the second connection request based on the third rule for handling connection requests directed to the mobile device; and routing the second connection request based on the third rule for handling connection requests directed to the mobile device, wherein routing the second connection request based on the third rule comprises routing the second connection request to a message inbox associated with the mobile device.

15. The non-transitory computer readable medium of claim 14, wherein determining to route the second connection request based on the third rule for handling connection requests directed to the mobile device is further based on a time of day when the second connection request is received.

16. A method comprising:
receiving, by a server comprising a processor from a first remote device via a network, a first connection request directed to a mobile device;
accessing, by the processor, information about the mobile device, the information comprising a first destination number corresponding to the mobile device and a second destination number corresponding to the mobile device, the first destination number associated with a first persona and a first billing account and the second destination number associated with a second persona and a second billing account, and the first persona associated with a first rule for handling connection requests directed to the mobile device and the second persona associated with a second rule for handling connection requests directed to the mobile device;
determining, by the processor based on an identity of the first remote device, that the first remote device is associated with the first persona; and
in response to determining that the first remote device is associated with the first persona,
transmitting, by the processor, the first connection request to the mobile device based on the first rule associated with the first persona to initiate a first session between the mobile device and the first remote device, and
associating, by the processor, the first session with the first billing account such that the first billing account is billed for the first session.

17. The method of claim 16, further comprising:
receiving, from the mobile device, an outgoing connection request to a second remote device;
determining, based on an identity of the second remote device, that the second remote device is associated with the second persona; and
transmitting the outgoing connection request to the second remote device, wherein the outgoing connection request is associated with the second destination number corresponding to the mobile device based on determining that the second remote device is associated with the second persona.

18. The method of claim 16, wherein the first session billed to the first billing account is not visible to the second billing account.

19. The method of claim 16, wherein the first destination number is also associated with a third persona, the third persona associated with a third rule for handling connection requests directed to the mobile device, and wherein the method further comprises:
receiving, via the network, a second connection request from a second remote device;
determining, based on an identity of the second remote device, that the second remote device is associated with the third persona;
determining, at least based on determining that the second remote device is associated with the third persona, to route the second connection request based on the third rule for handling connection requests directed to the mobile device; and
routing the second connection request based on the third rule for handling connection requests directed to the mobile device, wherein routing the second connection request based on the third rule comprises routing the second connection request to a message inbox associated with the mobile device.

20. The method of claim 19, wherein determining to route the second connection request based on the third rule for handling connection requests directed to the mobile device is further based on a time of day when the second connection request is received.

* * * * *